(No Model.)

R. W. FISK.
CHURN DASHER.

No. 314,322. Patented Mar. 24, 1885.

WITNESSES:
C. Neveux
C. Sedgwick

INVENTOR:
R. W. Fisk
BY Munn & Co
ATTORNEYS.

UNITED STATES PATENT OFFICE.

REDFORD W. FISK, OF COUNCIL GROVE, KANSAS.

CHURN-DASHER.

SPECIFICATION forming part of Letters Patent No. 314,322, dated March 24, 1885.

Application filed April 12, 1884. (No model.)

*To all whom it may concern:*

Be it known that I, REDFORD W. FISK, of Council Grove, in the county of Morris and State of Kansas, have invented a new and Improved Churn-Dasher, of which the following is a full, clear, and exact description.

The invention consists in the construction and arrangement of parts, as will be hereinafter described and claimed.

Reference is to be had to the accompanying drawings, forming part of this specification, in which similar letters of reference indicate corresponding parts in all the figures.

Figure 1:
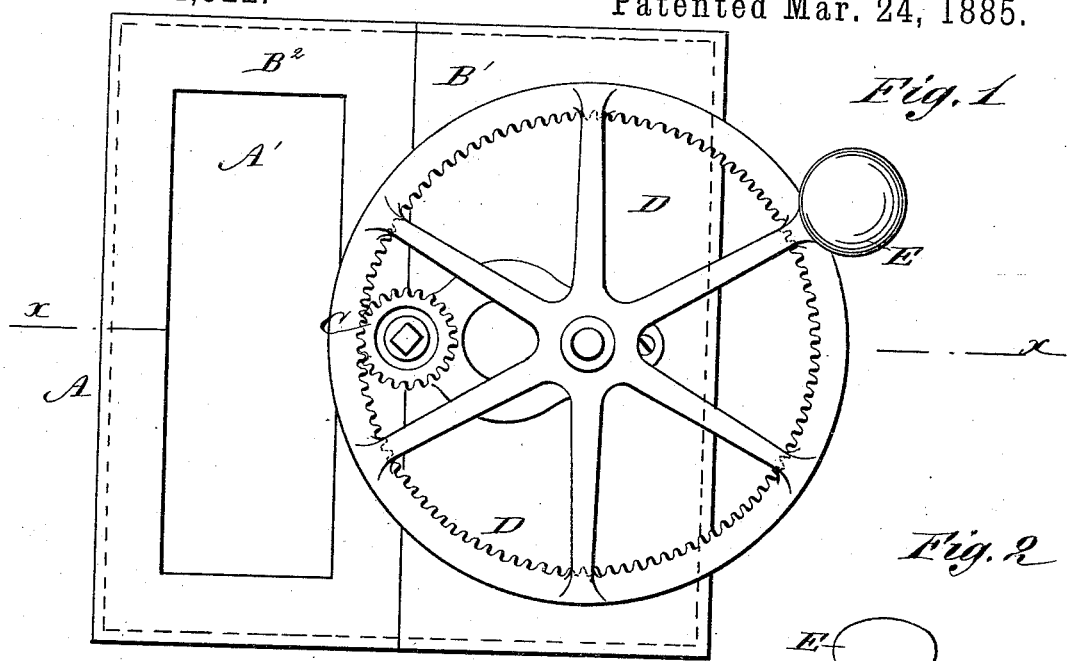
Figure 2:
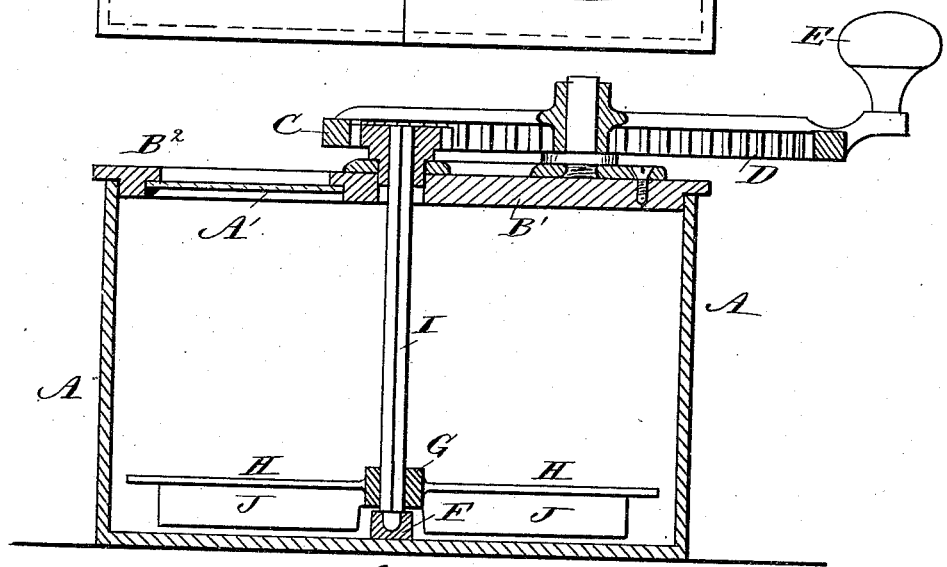
Figure 3:
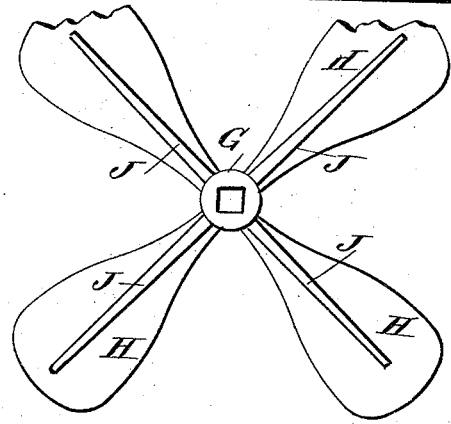

Figure 1 is a plan view of my improved churn. Fig. 2 is a longitudinal sectional elevation of the same on line $x\,x$. Fig. 3 is a plan view of the under side of the dasher, parts being broken out.

The cream-box A is preferably made square or angular, and is provided with a cover formed of two sections, $B'\,B^2$, of which the former is closed and the latter is provided with an opening for receiving a pane of glass, $A'$.

In two semicircular recesses in the adjoining edges of the cover the neck of a pinion, C, is journaled, which engages with an internal gear-wheel, D, journaled on the cover and provided with an upwardly-projecting handle, E, for turning it.

The pinion C and its neck are provided with a square opening for receiving the upper end of a square shaft, I, the lower end of which rests in a socket, F, on the upper surface of the bottom of the cream-box.

The dasher is formed of a hub, G, provided with a squared aperture for receiving the lower end of the shaft I, and with a series of radially-projecting flat horizontal wings, H, which extend almost to the sides of the cream-box, which wings are each provided with a downwardly-projecting longitudinally-central flange, J. The hub of the dasher rests in the socket F, and the bottom edges of the ribs J are from one-eighth to one-fourth of an inch from the bottom of the cream-box.

The dasher is revolved by turning the cog-wheel D, which revolves the pinion C and the shaft I.

The wings and their ribs, acting in connection with the bottom of the churn, form cups which, when rotated, force the cream rapidly from the center to the circumference, thereby attracting a sufficient quantity of air into the cream to properly aerate it. The churn can be operated with a small or large quantity of cream. The rapid motion of the dasher throws the cream against the sides of the box and thoroughly agitates the cream and keeps it from one to four inches higher at the circumference than at the center. The butter-globules float on the top of the cream and collect at the middle.

The dasher can be revolved in either direction.

I am aware that a dasher has been formed of a metal disk having a series of slats the edges of which are turned up and down, thus virtually forming what is termed a "propeller-blade." Radial wings were formed on the upper side of the disk between the several slats. This dasher was placed close to the bottom of the churn. Another form of dasher has also been provided, which consists of two hubs having radial arms provided with upwardly and downwardly extending flanges, one of the hubs and its arms being stationary. The flanges extending from both edges upward and downward of course neutralize the action of one another and are equivalent to a series of flat vertical blades. It is also old to form churn-dashers in the shape of a propeller-blade. I do not claim any of the above constructions as of my invention.

My flat horizontal blades with the fins J on their under sides form, in connection with the churn-bottom, pockets and draw the cream downward, when the fins force it outward against the sides of the vessel, thus raising the outer edges of the body of the cream higher than the center and thoroughly aerating it. The butter-globules rise to the top and cannot be broken. None of the constructions above referred to can operate in this manner, as in the construction first referred to, for instance, the cream is drawn through the slats and between the bottom of the churn and the disk. No fins are provided there for forming pockets to force the cream outward. The same is true of the other references. My construction obviates the use of the stationary blades of the second construction referred to.

Having thus described my invention, what I claim as new, and desire to secure by Letters Patent, is—

A churn-dasher consisting of the hub G and flat horizontal wings H projecting therefrom, said wings being each provided on their under sides with a depending fin, J, substantially as described, and for the purpose set forth.

REDFORD W. FISK.

Witnesses:
CHAS. F. KEAN,
D. C. WEBB.